US011047262B2

(12) United States Patent
Gaches et al.

(10) Patent No.: US 11,047,262 B2
(45) Date of Patent: Jun. 29, 2021

(54) AIRCRAFT PROPULSION SYSTEM COMPRISING AN INTERNAL FIXED STRUCTURE WITH A DISCHARGE SLOT

(71) Applicant: Airbus Operations SAS, Toulouse (FR)

(72) Inventors: Thierry Gaches, Castelnau d'Estretefonds (FR); Lionel Czapla, Cornebarrieu (FR); Bastian Sabathier, Fonsorbes (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 208 days.

(21) Appl. No.: 16/424,650

(22) Filed: May 29, 2019

(65) Prior Publication Data

US 2019/0383172 A1    Dec. 19, 2019

(30) Foreign Application Priority Data

Jun. 13, 2018   (FR) ........................................ 1855145

(51) Int. Cl.
| | |
|---|---|
| *F01D 25/26* | (2006.01) |
| *F01D 25/30* | (2006.01) |
| *F02K 3/06* | (2006.01) |
| *F02K 3/105* | (2006.01) |

(52) U.S. Cl.
CPC ............. *F01D 25/26* (2013.01); *F01D 25/30* (2013.01); *F02K 3/06* (2013.01); *F02K 3/105* (2013.01); *F05D 2240/14* (2013.01); *F05D 2260/605* (2013.01)

(58) Field of Classification Search
CPC ...... F01D 25/26; F05D 2260/605; F02C 3/06; F02C 3/105; F02C 1/82
See application file for complete search history.

(56) References Cited

U.S. PATENT DOCUMENTS

| 4,841,726 | A | 6/1989 | Burkhardt | |
|---|---|---|---|---|
| 9,714,612 | B2 | 7/2017 | Lacko | |
| 2010/0242433 | A1* | 9/2010 | Prat | F02K 3/06 |
| | | | | 60/204 |
| 2011/0265490 | A1* | 11/2011 | Klasing | F02K 3/06 |
| | | | | 60/785 |
| 2016/0222886 | A1* | 8/2016 | Riehle | F02C 7/18 |
| 2017/0088275 | A1* | 3/2017 | Willie | B64D 27/12 |

FOREIGN PATENT DOCUMENTS

| DE | 102011106961 A1 | 1/2013 |
|---|---|---|
| FR | 2590320 A1 | 5/1987 |

OTHER PUBLICATIONS

French Search Report; priority document.

\* cited by examiner

*Primary Examiner* — Katheryn A Malatek
(74) *Attorney, Agent, or Firm* — Greer, Burns & Crain, Ltd.

(57) ABSTRACT

A propulsion system for an aircraft. The propulsion system comprises a core, an internal fixed structure secured to the core and arranged around the core, and a nacelle surrounding the core and the internal fixed structure in which a secondary flow path is delimited between the internal fixed structure and the nacelle. The internal fixed structure has a slot which permits fluidic communication between a compartment on the inside of the internal fixed structure and the secondary flow path.

4 Claims, 4 Drawing Sheets

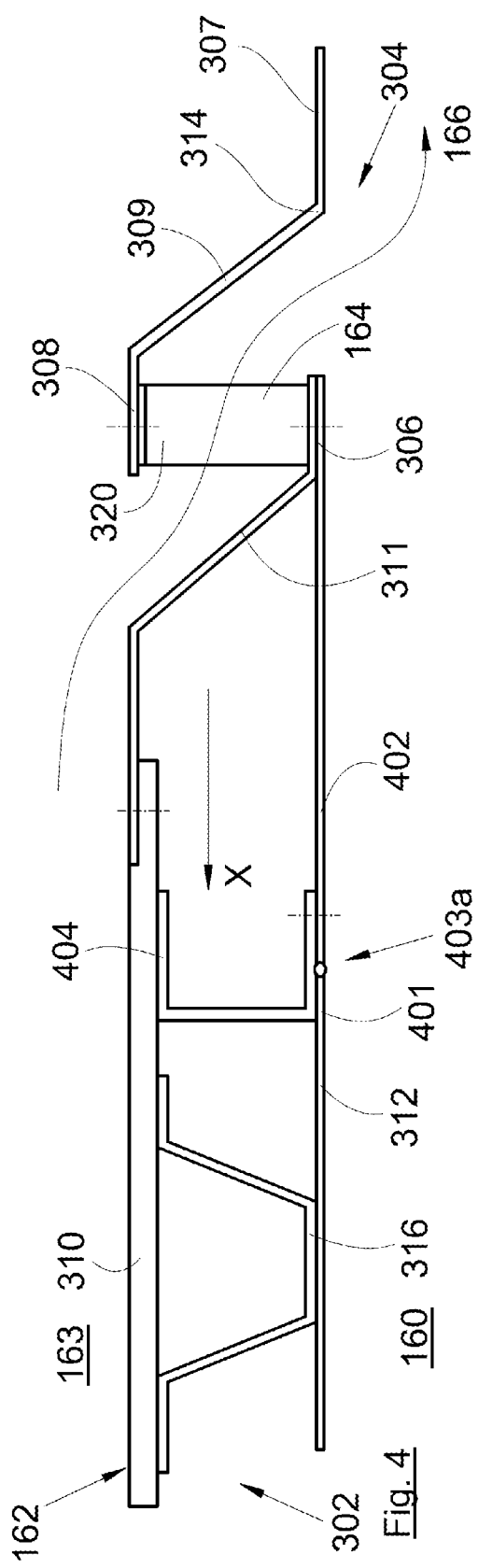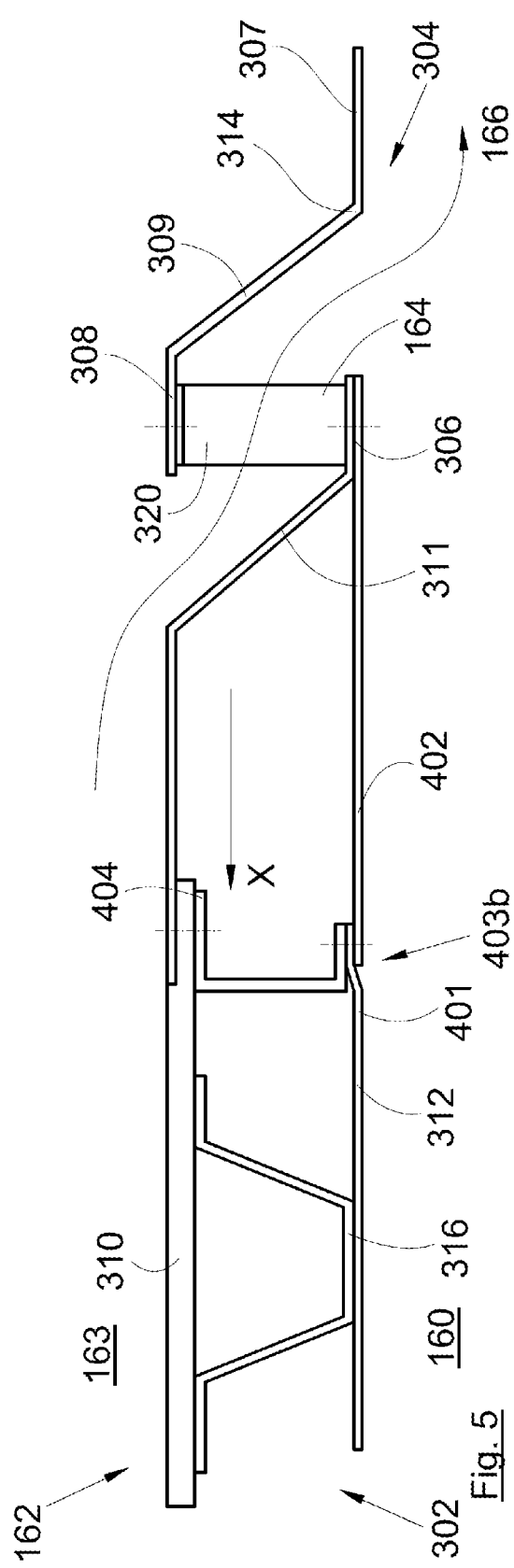

AIRCRAFT PROPULSION SYSTEM COMPRISING AN INTERNAL FIXED STRUCTURE WITH A DISCHARGE SLOT

CROSS-REFERENCES TO RELATED APPLICATIONS

This application claims the benefit of the French patent application No. 1855145 filed on Jun. 13, 2018, the entire disclosures of which are incorporated herein by way of reference.

FIELD OF THE INVENTION

The present invention relates to an aircraft propulsion system comprising an internal fixed structure having a slot for discharging the hot gases. The present invention also relates to an aircraft comprising at least one such propulsion system.

BACKGROUND OF THE INVENTION

FIG. 7 is a side view in cross section of a propulsion system 600 of the prior art for an aircraft. The propulsion system 600 adopts the form of a turbomachine comprising a core 602 and a nacelle 604 arranged around the core 602 and a fan 606 mounted at the front of the core 602.

Air enters the propulsion system 600 via an air inlet 608 delimited by the front of the nacelle 604.

Having passed through the fan 606, the air splits into a primary flow which passes through the core 602 which, amongst other things, comprises a combustion system, and into a secondary flow which circulates between the core 602 and the nacelle 604 in a secondary flow path 610 provided for that purpose.

The secondary flow path 610 is thus delimited on the outside by the nacelle 604 and on the inside by an internal fixed structure 612 (also known by its English-language abbreviation IFS) secured to the core 602.

The internal fixed structure 612 adopts the overall form of a cylinder which closes the compartment around the core 602.

With the increase in engine bypass ratios, the cores and the compartments surrounding them are becoming increasingly hot and it is necessary to remove this heat in order to limit the temperature of the zone so that equipment can be installed or so that more lightweight materials can be used.

SUMMARY OF THE INVENTION

It is one object of the present invention to propose an aircraft propulsion system comprising an internal fixed structure with a slot for discharging the hot gases that makes it possible to limit the temperature of the compartment around the core of this same propulsion system.

To this end, the invention proposes a propulsion system for an aircraft, the propulsion system comprising: a core, an internal fixed structure secured to the core and arranged around the core, and a nacelle surrounding the core and the internal fixed structure, in which a secondary flow path is delimited between the internal fixed structure and the nacelle, the propulsion system being characterized in that the internal fixed structure has a slot which permits fluidic communication between the secondary flow path and a compartment which is on the inside of the internal fixed structure and around the core.

The presence of the slot allows some of the hot gases present in the compartment around the core to be discharged, and thus makes it possible to limit the temperature of the core and of the zone around the core.

Advantageously, the internal fixed structure comprises a front panel which is arranged at the front of the slot and a rear panel arranged at the rear of the slot, the slot is defined by a gap between the front panel and the rear panel, and spacers, arranged across the slot are fixed to the front panel and to the rear panel.

Advantageously, the front panel comprises an interior wall facing towards the compartment and an exterior wall facing towards the secondary flow path, at a rear end of the front panel, the interior wall meets the exterior wall via an inclined plane, the rear panel adopts the form of a plate which comprises a front part which from a distance extends the interior wall, a rear part which is to the rear of the front part and which from a distance extends the exterior wall, and a bend which connects the rear part and the front part, the slot is embodied between the interior wall and the front part, on the one hand, between the rear end and the rear part and, on the other hand, between the inclined plane and the bend, and the spacers are fixed between the rear end and the front part.

Advantageously, the propulsion system comprises a plurality of stiffeners, in which each is fixed in the compartment, on the one hand, to the interior wall and, on the other hand, to the rear panel.

Advantageously, the exterior wall comprises a front plate which extends from the front as far as a junction zone and a rear plate which extends from the junction zone to the rear end.

The invention also proposes an aircraft comprising a propulsion system according to one of the previous forms.

BRIEF DESCRIPTION OF THE DRAWINGS

The abovementioned features of the invention, together with others, will become more clearly apparent from reading the following description of one exemplary embodiment, the description being given in connection with the attached drawings, among which:

FIG. 4 is a schematic depiction of an internal fixed structure viewed in section according to a first alternative form of embodiment of the invention, FIG. 5 is a schematic depiction of an internal fixed structure viewed in section according to a second alternative form of embodiment of the invention.

DETAILED DESCRIPTION OF THE PREFERRED EMBODIMENTS

Figure 1:
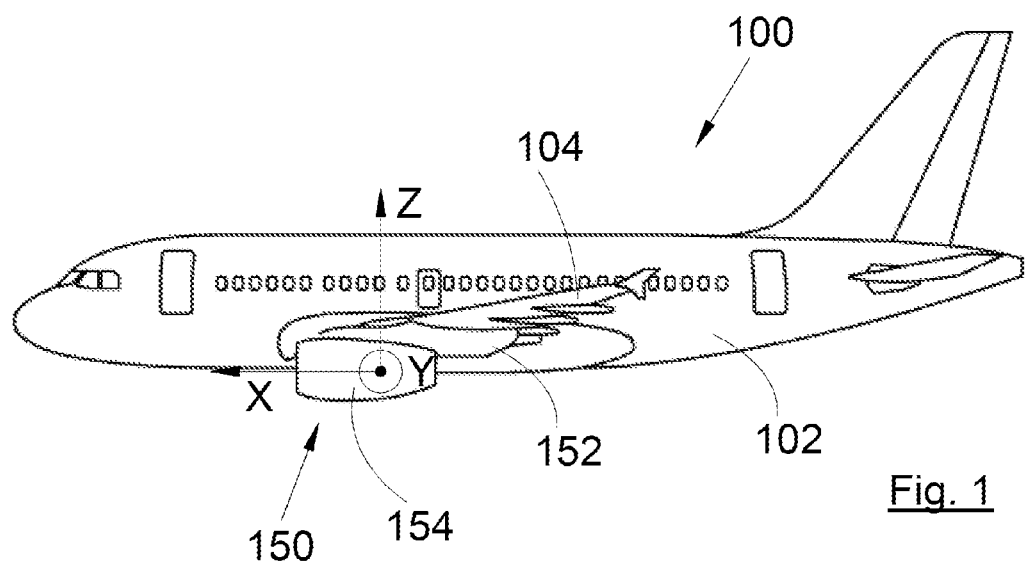
FIG. 1 is a side view of an aircraft according to the invention.
Figure 7:
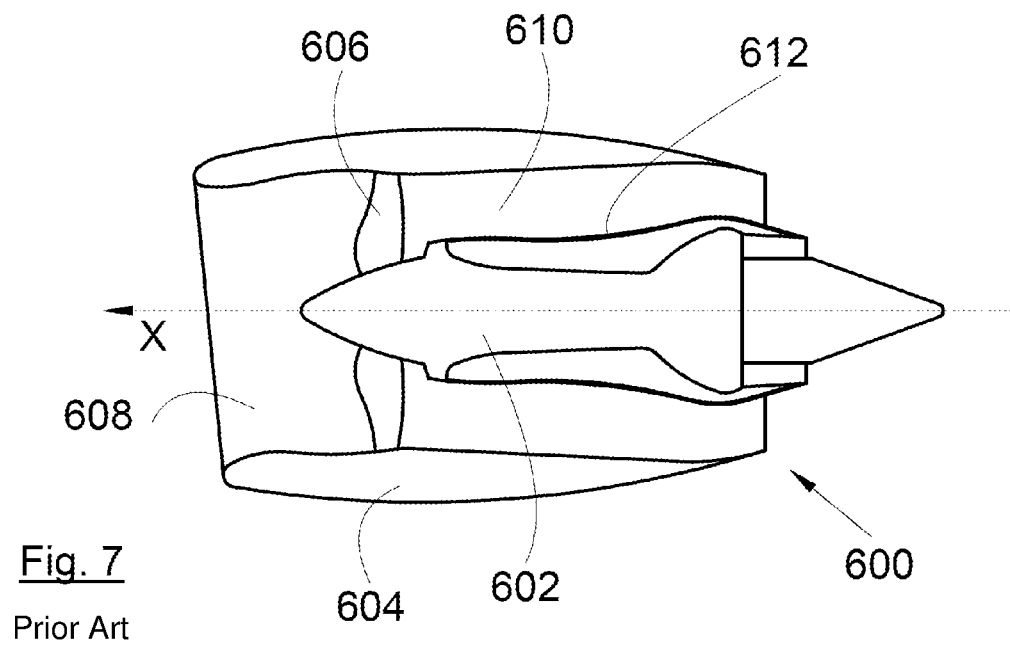
FIG. 7 is a side view in cross section of a propulsion system of the prior art.

In the description which follows, terms relating to a position are considered with reference to an aircraft in a position of forward motion, namely as depicted in FIG. 1.

FIG. 1 shows an aircraft 100 which comprises a fuselage 102 and a wing 104 on each side of the fuselage 102. Beneath each wing 104, the aircraft 100 has a pylon 152 under which a propulsion system 150 in the form of a turbomachine is fixed.

In the following description and by convention, the longitudinal axis of the propulsion system 150, oriented positively in the direction of forward travel of the aircraft 100 is referred to as X, the transverse direction which is horizontal when the aircraft is on the ground is referred to as Y, and the vertical direction or vertical height when the aircraft is on the ground is referred to as Z, these three directions X, Y and Z being mutually orthogonal.

Figure 2:
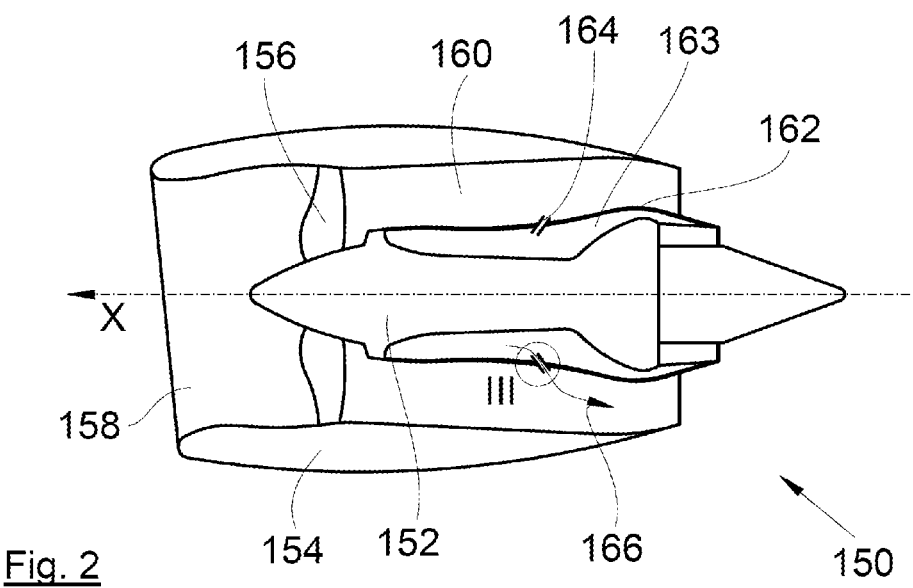
FIG. 2 is a side view in cross section of a propulsion system according to the invention.

FIG. 2 shows the propulsion system 150 the structure of which is similar to that of the propulsion system 600 of the prior art.

The propulsion system 150 comprises a core 152 and a nacelle 154 arranged around the core 152 and a fan 156 mounted at the front of the core 152.

Air enters the propulsion system 150 via an air inlet 158 delimited by the front of the nacelle 154. Having passed through the fan 156, the air splits into a primary flow which passes through the core 152 which, amongst other things, comprises a combustion system, and into a secondary flow which circulates between the core 152 and the nacelle 154 in a secondary flow path 160 provided for that purpose.

The secondary flow path 160 is thus delimited on the outside by the nacelle 154 and on the inside by an internal fixed structure 162 (also known by its English language acronym IFS) secured to the core 152.

The internal fixed structure 162 adopts the overall shape of a cylinder around the core 152 and thus delimits a compartment 163 around the core 152. The internal fixed structure 162 provides internal guidance for the hot gases circulating in the core 152.

The nacelle 154 also surrounds the internal fixed structure 162.

The internal fixed structure 162 may be made up of two cowls which are mounted in an articulated manner about a hinge axis, particularly at the upper part of the core 152, to allow them to be moved away from the core 152 during maintenance procedures.

In order to remove the heat from the compartment 163 around the core 152, the internal fixed structure 162 has a slot 164 which allows fluidic communication between the secondary flow path 160 and the compartment 163 which is on the inside of the internal fixed structure 162. The slot 164 allows the evacuation of the hot gases present in the compartment 163 around the core 152.

The heat can thus be removed into the secondary flow path 160 as shown by the arrow 166.

The slot 164 may be a single slot which extends all around the internal fixed structure 162 or a succession of several slots arranged one after the other. In particular, in the case where the internal fixed structure 162 comprises two cowls, there is one slot per cowl.

Figure 3:
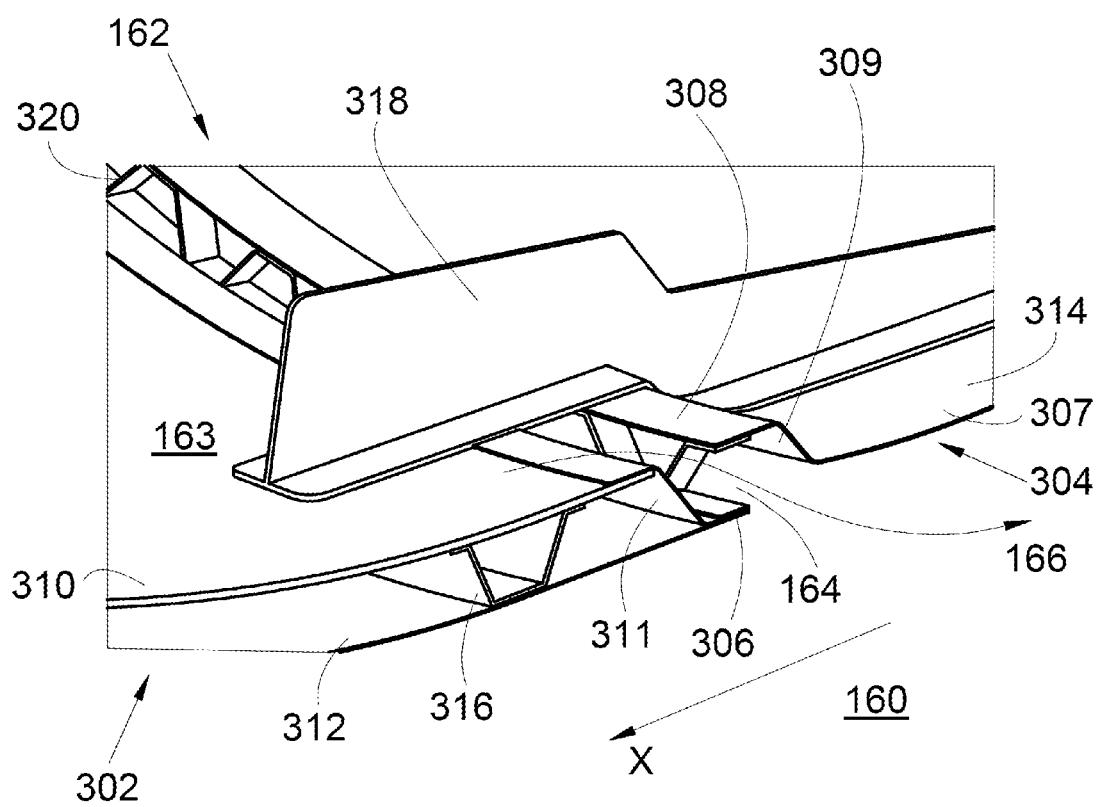
FIG. 3 is a perspective view of an enlargement of detail III of FIG. 2.
Figure 6:
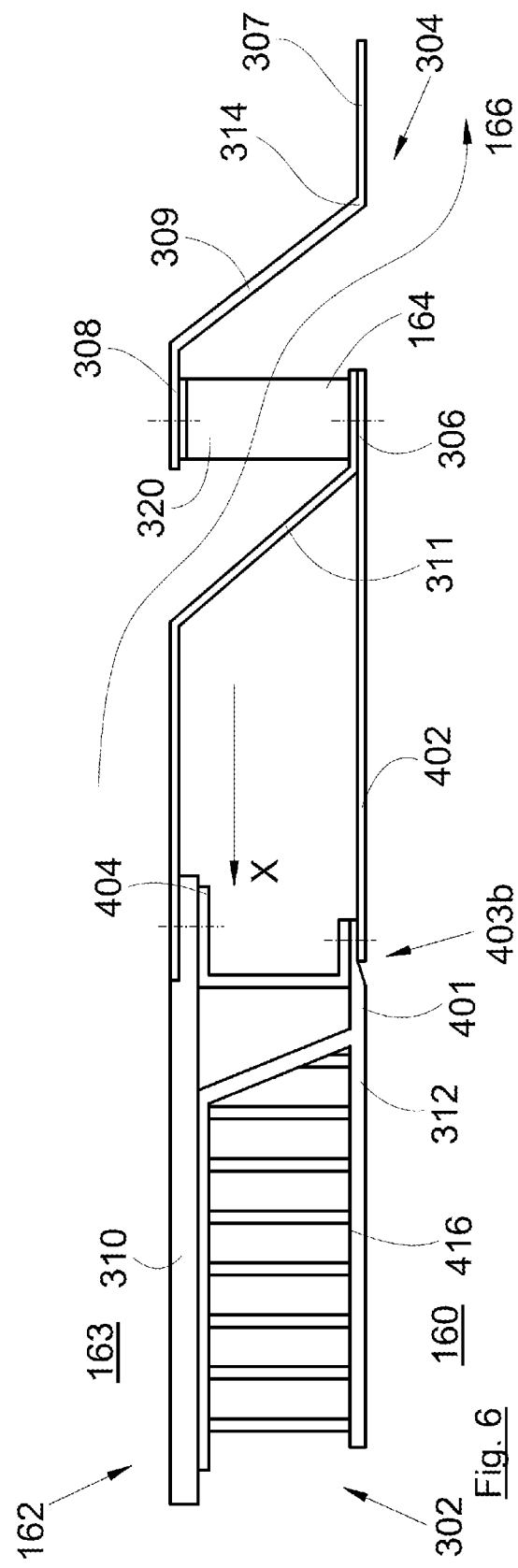
FIG. 6 is a schematic depiction of an internal fixed structure viewed in section according to a third alternative form of embodiment of the invention.

FIG. 3 shows the internal fixed structure 162 which separates the compartment 163 from the secondary flow path 160. FIGS. 4 to 6 show three alternative forms of FIG. 3.

In the embodiment of the invention set out in FIGS. 3 to 6, the internal fixed structure 162 comprises a front panel 302, which is arranged at the front of the slot 164, and a rear panel 304 arranged at the rear of the slot 164 and which joins onto the jet nozzle.

The gap between the front panel 302 and the rear panel 304 embodies the slot 164 and the gap is maintained by the fitting of spacers 320 arranged across the slot 164 between the front panel 302 and the rear panel 304 and which are fixed both to the front panel 302 and to the rear panel 304. In the embodiment of the invention set out in FIG. 3, the spacers 320 adopt the form of a succession of omega-sections.

The front panel 302 comprises an interior wall 310 facing towards the compartment 163 and an exterior wall 312 facing towards the secondary flow path 160.

At the rear end 306 of the front panel 302, the interior wall 310 meets the exterior wall 312 via an inclined plane 311 to form a skirt which delimits the slot 164.

The rear panel 304 here adopts the form of a plate 314 which comprises a front part 308 in the form of a skirt which from a distance extends the interior wall 310, a rear part 307 which is to the rear of the front part 308 and which from a distance extends the exterior wall 312, and a bend 309 which connects the rear part 307 and the front part 308.

The slot 164 is thus embodied between the interior wall 310 and the front part 308, on the one hand, between the rear end 306 and the rear part 307, on the other hand, and between the inclined plane 311 and the bend 309.

The spacers 320 are fixed between the rear end 306 and the front part 308.

Fixing is performed, for example, using screw/nut systems.

In the embodiments of FIGS. 4 and 5, in order to reinforce the front panel 302, reinforcers 316 are fixed between the interior wall 310 and the exterior wall 312, for example using screw/nut systems. In the embodiment of the invention set out in FIG. 3, the reinforcer 316 adopts the form of an omega section.

In the embodiment of FIG. 6, in order to reinforce the front panel 302, a composite structure 416 is fixed between the interior wall 310 and the exterior wall 312, for example by bonding. The composite structure 416 comprises two plates between which a honeycomb structure is fixed and, in the embodiment of the invention set out in FIG. 6, one of the plates is produced by the exterior wall 312.

The inclined plane 311 may be integrated into the components 310 and 312, but may also be added on, in which case the inclined plane 311 is fixed between the interior wall 310 and the exterior wall 312 for example using screw/nut systems.

In order to ensure the cohesion of the internal fixed structure 162 between the front panel 302 and the rear panel 304, the propulsion system comprises a plurality of stiffeners 318, in which each is fixed in the compartment 163, on the one hand, to the interior wall 310 and, on the other hand, to the rear panel 304. Fixing is achieved, for example, using rivets or using screw/nut systems.

The materials used to make the various elements of the propulsion system are, for example, a titanium alloy or a high-temperature composite.

The exterior wall 312 may be of one piece between the front and the rear end 306, but may be divided into two.

FIGS. 4 to 6 show alternative forms of embodiment in which the exterior wall 312 comprises a front plate 401 which extends from the front as far as a junction zone 403a-b and a rear plate 402 which extends from the junction zone 403a-b to the rear end 306. The rear plate 402 constitutes a reinforcing plate which has a rigidity higher than that of the front plate 401.

The zone 403a-b corresponds to the zone where the front plate 401 and the rear plate 402 are fixed to one another.

In the case of FIG. 4 for example, the junction zone 403a corresponds to a welded seam. In the case of FIGS. 5 and 6, still by way of example, the junction zone corresponds to a fixing using a screw/nut system.

The connection 403a-b between the plates 401 and 402 makes it possible to optimize the local design of the components to that which is just necessary. Thus, the rear plate 402 and the front plate 401 may be made in different materials and be fixed to one another by a screw/nut connection (type 403b). Thus, the rear plate 402 and the front plate 401 may have different thicknesses and be fixed to one another using a welded connection (type 403a) or a screw/nut connection (type 403b) or some other form of connection in order to optimize integrity and mass.

The rear plate 402, the inclined plane 311 and the bend 309 are in contact with the hot air of the compartment 163. The materials of these elements will therefore be suited to the air temperatures and made for example from titanium, Inconel, steel, high and low temperature composites, or the like.

In order to reinforce the junction zone 403a-b, a reinforcing frame 404 is fixed between the interior wall 310 and the exterior wall 312 at the junction zone 403a-b.

The reinforcing frame 404 comprises a web, a first flange fixed to the interior wall 310 and a second flange fixed to the front plate 401 and to the rear plate 402. Here, the reinforcing frame 404 is a C-section frame, but it could be an I-section frame. The first flange and the second flange are fixed to each of the ends of the web.

In the case of FIG. 5, the front plate 401 is sandwiched between the second flange and the rear plate 402.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system for an aircraft, the propulsion system comprising:
a core,
an internal fixed structure secured to the core and arranged around the core, and
a nacelle surrounding the core and the internal fixed structure, in which a secondary flow path is delimited between the internal fixed structure and the nacelle,
wherein the internal fixed structure has a slot which permits fluidic communication between the secondary flow path and a compartment defined between the internal fixed structure and the core,
wherein the internal fixed structure comprises a front panel arranged forward the slot and a rear panel arranged aft of the slot, wherein the slot is defined by a gap between the front panel and the rear panel,
wherein spacers, arranged across the slot are fixed to the front panel and to the rear panel,
wherein the front panel comprises an interior wall radially inward of an exterior wall,
wherein, at a rear end of the front panel, the interior wall comprises an inclined plane which extends to the exterior wall,
wherein the rear panel is formed by a single wall and comprises a front part, a rear part and a bend which connects the rear part and the front part, wherein the front part is radially inward and axially forward of the rear part;
and
wherein the spacers are fixed between the rear end of the front panel and the front part of the rear panel.

2. The propulsion system according to claim 1, further comprising a plurality of stiffeners, each stiffener being fixed in the compartment to the interior wall and to the rear panel.

3. The propulsion system according to claim 1, wherein the exterior wall comprises a front plate extending forward from a junction zone and a rear plate extending aftward from the junction zone to the rear end.

4. The aircraft comprising the propulsion system according to claim 1.

* * * * *